(No Model.)

L. D. McINTOSH.
GALVANIC BATTERY.

No. 273,751. Patented Mar. 13, 1883.

Witnesses:
Albert H. Adams.
O. W. Bond.

Inventor:
Lyman D. McIntosh

UNITED STATES PATENT OFFICE.

LYMAN D. McINTOSH, OF CHICAGO, ILLINOIS.

GALVANIC BATTERY.

SPECIFICATION forming part of Letters Patent No. 273,751, dated March 13, 1883.

Application filed June 10, 1882. (No model.)

*To all whom it may concern:*

Be it known that I, LYMAN D. McINTOSH, residing at Chicago, in the county of Cook and State of Illinois, and a citizen of the United States, have invented a new and useful Improvement in Galvanic Batteries, of which the following is a full description, reference being had to the accompanying drawings, in which—

Figure 1:
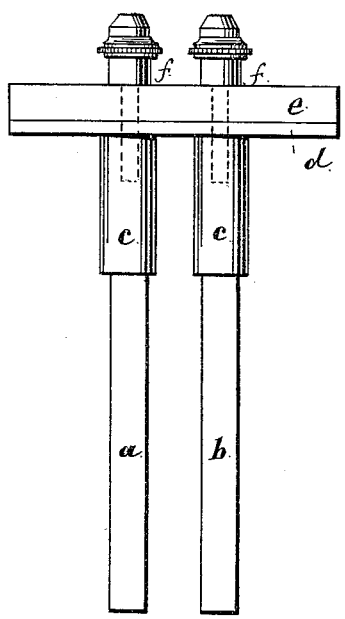
Figure 2:
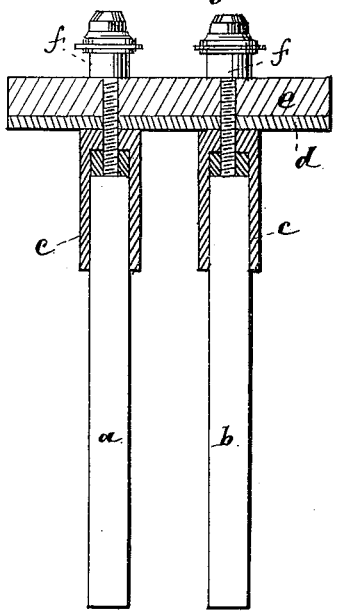
Figure 3:
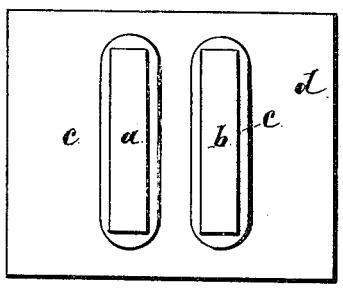

Figure 1 is a side elevation; Fig. 2, a vertical section; Fig. 3, an under side view.

In the use of galvanic batteries considerable trouble and inconvenience arise from the action of the battery-fluid on the elements or plates composing the battery, such action tending to produce a corrosion of the plates, and oftentimes destroying the connections before the dissolution of the element or plate is entirely completed.

The object of this invention is to overcome and obviate this corrosive action of the battery-fluid at the point where such action would interfere with or destroy the connection; and its nature consists in incasing the ends of the battery elements, where the connection is made, with a non-conducting material which will act to prevent any action of the battery-fluid on the plates or elements at the point where the incasing material is provided.

In the drawings a section only of the elements or plates of a battery is shown, that being all that is necessary to illustrate the invention.

In the drawings, *a* represents the positive plate or element of the battery; *b*, the negative; *c*, the incasing material; *d*, the packing of rubber or other soft material on the supporting-plate, to make a tight joint; *e*, the supporting-plate; *f*, the binding-screws, through which the connection is made with the battery plates or elements, and by which such plates are attached to the supporting-plate.

The plates or elements are to be arranged in pairs—positive and negative—as usual, and the pairs may consist of a zinc and a carbon plate or other element having a positive and negative quality, and as many of such plates are to be used as are required to produce a current of the desired intensity. The upper ends, or the ends of these plates adjacent to the supporting-plate, are each covered or incased in a material, *c*, which is non-conducting, and this incasing extends down the plate sufficiently far to come below the point where the connecting wire or plate terminates, so that the action of the fluid will be wholly and entirely below such connection. This material *c* may be vulcanized rubber, glass, or other non-conductor, and can be applied in various ways, so long as it is made to adhere firmly to the exterior of the plate on all sides and produce a tight joint between it and the surface of the plate. If vulcanized rubber is used, it can be applied by placing the soft rubber around the plate and then thoroughly vulcanizing it, so that the contraction of the rubber in vulcanizing will produce a perfectly-tight joint, and will cause a close adhesion of one material to the other. If other non-conductors are used, they can be applied in any suitable manner, the manner of applying depending upon the nature of the material. This covering or incasing material should be of sufficient thickness to form an effectual barrier to the action of the fluid on the element or plate, and should not be of much greater length than is required for the length of the connecting wire or plate. This covering or incasing material does not in any manner interfere with the action of the battery, as that portion of the plates below the material is free to be acted on by the battery-fluid and produce the current; and it will be seen that by providing a casing as described that portion of the plate in which is located the connection cannot be affected by the corrosive action, as such action cannot take place beneath the material, and the point where it does occur is entirely below the connection, so that the connection remains intact until the plate or element is destroyed or becomes unfit for use; and it will also be seen that the connection is in no wise broken or interrupted, as it is made directly with the plate, the same as if no non-conducting incasing material were provided.

The packing *d*, supporting the plate *e*, and binding-screws *f*, may be of any of the usual and well-known forms of construction and arrangement, the screws entering the upper end of the battery element, as usual.

In case carbon or light thin metal plates are used to form the battery, it is the general custom to provide a piece of metal which is securely fastened to the plate, through which metal the connection is made with the binding-post, and in this form of construction the vulcanized rubber or other non-conducting material could be applied around such plate and form an effectual protector for the connection between the piece of metal and the plate or element, just the same as when applied around the plate or element.

What I claim as new, and desire to secure by Letters Patent, is—

1. The combination, with the positive and negative plates of a galvanic battery, of the non-conducting material c, incasing the upper end portions of each plate and extending along the length of the same where they are connected with the supporting-plate, for protecting the plates from the corrosive action of the battery-fluid at the point where connection is made with the said plates, substantially as described.

2. The positive and negative plates herein described for a galvanic battery, having their upper ends incased by a non-conducting material which surrounds and extends along the length of such upper end portions, and is interposed between the same and the supporting-plate, for protecting the plates from the corrosive action of the battery-fluid at the points where the connection is made with said plates, substantially as described.

LYMAN D. McINTOSH.

Witnesses:
  ALBERT H. ADAMS,
  O. W. BOND.